US 6,747,986 B1
Jun. 8, 2004

(54) PACKET PIPE ARCHITECTURE FOR ACCESS NETWORKS

(75) Inventors: Phillippe Charas, Upplands-Väsby (SE); Riccardo Carli, Rome (IT); Luigi Ronchetti, Grottaferrata Rome (IT)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/438,225

(22) Filed: Nov. 12, 1999

Related U.S. Application Data

(60) Provisional application No. 60/109,899, filed on Nov. 25, 1998.

(51) Int. Cl.[7] .................................................. H04J 3/22
(52) U.S. Cl. ............................................................ 370/465
(58) Field of Search ........................ 370/465, 328–338, 370/389–398, 230–237, 349, 409–412, 503, 399, 469, 351, 431, 464, 236, 258, 252, 468, 440, 352; 709/226, 217, 230–235, 238; 710/305, 107–112, 171; 455/442, 436; 379/56.2

(56) References Cited

U.S. PATENT DOCUMENTS

| | | | | |
|---|---|---|---|---|
| 5,412,660 A | * | 5/1995 | Chen et al. ................... 370/318 |
| 5,434,854 A | * | 7/1995 | Focarile et al. .............. 370/335 |
| 5,438,565 A | * | 8/1995 | Hemmandy et al. ......... 370/335 |
| 5,619,499 A | * | 4/1997 | Nakabayashi ................ 370/469 |
| 5,619,550 A | * | 4/1997 | Averbuch et al. ............... 379/5 |
| 5,633,868 A | * | 5/1997 | Baldwin et al. .............. 370/331 |
| 5,729,536 A | * | 3/1998 | Doshi et al. ................. 370/328 |
| 5,974,496 A | * | 10/1999 | Miller .......................... 710/128 |
| 6,259,699 B1 | * | 7/2001 | Opalka et al. ............... 370/398 |
| 6,314,163 B1 | * | 11/2001 | Acampora .................. 379/56.2 |
| 6,377,579 B1 | * | 4/2002 | Ofek ............................. 370/395 |
| 6,452,915 B1 | * | 9/2002 | Jorgensen .................... 370/338 |
| 6,526,063 B1 | * | 2/2003 | St-Amand et al. ........... 370/395 |

FOREIGN PATENT DOCUMENTS

WO    WO 99/48310    9/1999

OTHER PUBLICATIONS

*A System Scenario for Wireless Broadband Access with Multimedia Support*; by Jouni Mikkonen et al., IEEE 6th International Conf. on Universal Personal Comm. Record, vol. 2, 1997, pp. 780–784, XP002901084, Finland.

(List continued on next page.)

*Primary Examiner*—Chi Pham
*Assistant Examiner*—Prenell Jones

(57) ABSTRACT

A packet pipe architecture for an access network (e.g., provides access to an IP, ATM or similar packet-based network in order to convey packet data traffic), whereby the network interfaces with the packet pipe are standardized so that any packet pipe that satisfies the interface requirements can be utilized in the same access network. Also, the packet pipe uses a packet-based protocol stack with Quality of Service provisions for service delivery instead of the conventional best effort service delivery functions used. Consequently, the packet pipe and access network are capable of providing all of the numerous services available with an IP, ATM or similar packet-based network layered architecture.

11 Claims, 4 Drawing Sheets

OTHER PUBLICATIONS

*Emerging Wireless Broadband Networks*; by Jouni Mikkonen et al., IEEE Communications Magazine, vol. 36, Feb. 1998, pp. 112–117, XP002901085.

*Current Topics in Wireless & Mobile ATM Networks*: QoS Control, IP Support and Legacy Service Integration; by D. Raychaudhuri, The Ninth International Symposium on Personal, Indoor and Mobile Radio Comm., vol. 1, Sep. 1998, pp. 38–44, XP002901086.

*An Integrated QoS Architecture for GSM Networks*; by Jouni Mikkonen, IEEE 1998 International Conference on Universal Personal Comm., vol. 1, Oct. 1998, pp. 403–407, XP002901087, Finland.

*Support of Mobile Multimedia Over Radio for a Wide Range of QoS and Traffic Profiles*; by Dr. Brian G. Marchent et al, 1999 International Conf. on Personal Wireless Comm., Feb. 1999, pp. 145–149, XP002901088.

*A Simple QoS Signaling Protocol for Mobile Hosts in the Integrated Services Internet*; by Andreas Terzis et al, Eighteenth Annual Joint Conf. of the IEEE, vol. 3, Mar. 1999, pp. 1011–1018, XP002901089.

*AQuaFWiN: Adaptive QoS Framework for Multimedia in Wireless Networks and its Comparison with other QoS Frameworks*; by Bobby Vandalore et al., LCN 99, Conf. on Local Computer Networks, Oct. 1999, pp. 88–97, XP002901090.

* cited by examiner

PACKET PIPE ARCHITECTURE FOR ACCESS NETWORKS

CROSS-REFERENCES TO RELATED APPLICATIONS

This Application for Patent claims the benefit of priority from, and hereby incorporates by reference the entire disclosure of, co-pending U.S. Provisional Application for Patent Serial No. 60/109,899, filed Nov. 25, 1998.

BACKGROUND OF THE INVENTION

1. Technical Field of the Invention

The present invention relates in general to the telecommunications field and, in particular, to a packet pipe architecture for access networks.

2. Description of Related Art

Present day wireless telecommunication systems are vertically integrated. This structure implies that the radio air interface specifications which define the physical layer (as well as the network layers) and the medium's access control functions are often proprietary and tailored to fit particular applications such as voice or best effort data communications. However, a significant problem with the existing radio air interface specifications is that they have evolved with a circuit-switched legacy. Consequently, attempts to convey Internet Protocol (IP) or Asynchronous Transfer Mode (ATM) data over the existing (circuit-switch-based) air interfaces have resulted in cumbersome, complex, and proprietary patchwork design solutions which are inefficient and incapable of handling the complete plethora of services that can be provided by these network models.

For example, FIG. 1 is a block diagram of an existing protocol stack that can be used by a generic access concentrator (e.g., an Asymmetric Digital Subscriber Line (ADSL) access network or radio access network) to access an IP network such as the Internet, and convey packet data traffic therebetween. The basic idea behind the protocol stack architecture shown in FIG. 1 is that a logical point-to-point link can be constructed between the Terminal Equipment (TE) and the access router (i.e., Edge Router in this case) devices using conventional layer 2 "tunneling" protocols (e.g., based on a conventional IP model). Network terminations at the layer 1 and/or layer 2 levels of the stack enable the relaying of IP packets locally between devices, in accordance with the best effort principles used. However, as mentioned earlier, a problem with such an approach is that it is limited to best effort type applications, and therefore, is not capable of handling all of the numerous services available with an IP or ATM layered architecture. Consequently, a significant need exists in the wireless telecommunications field for a new network access architecture that can improve on the efficiency of existing radio air interfaces while minimizing the complexity of the approach used. As described in detail below, the present invention successfully solves the above-described problems and satisfies this need.

SUMMARY OF THE INVENTION

In accordance with a preferred embodiment of the present invention, a packet pipe architecture is provided for an access network (e.g., provides access to an IP, ATM or similar packet-based network to convey packet data traffic therebetween), whereby the network interfaces with the packet pipe are standardized so that any packet pipe that satisfies the interface requirements can be utilized in the same access network. Also, the packet pipe uses a packet-based protocol stack with QoS provisions for service delivery instead of the conventional best effort service delivery functions used. Consequently, the packet pipe and access network are capable of providing all of the numerous services available with an IP, ATM or similar packet-based network layered architecture.

An important technical advantage of the present invention is that a packet pipe architecture is provided for an access network that can be optimized for IP, ATM or similar packet-based network packet data traffic.

Another important technical advantage of the present invention is that a packet pipe architecture is provided for an access network that can increase the efficiency of a radio air interface used.

Still another important technical advantage of the present invention is that a packet pipe architecture is provided for an access network that can minimize the complexity of the approach used.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
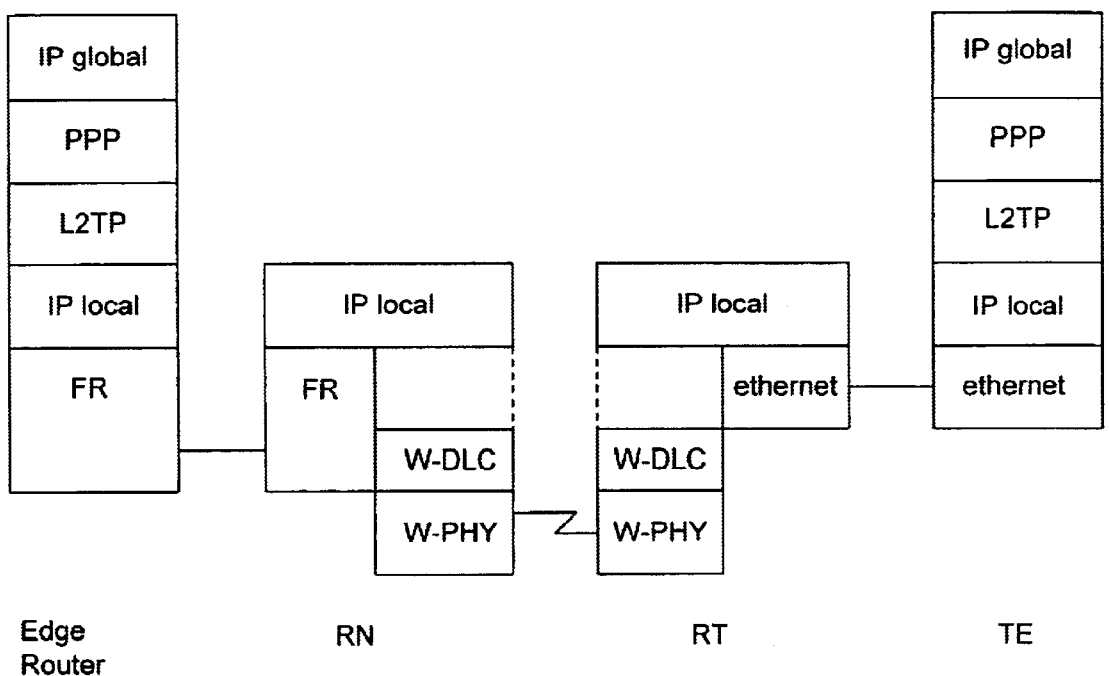
FIG. 1 is a block diagram of an existing protocol stack that can be used by a generic access concentrator or access network to access an IP network and convey packet data traffic therebetween.
Figure 2A:
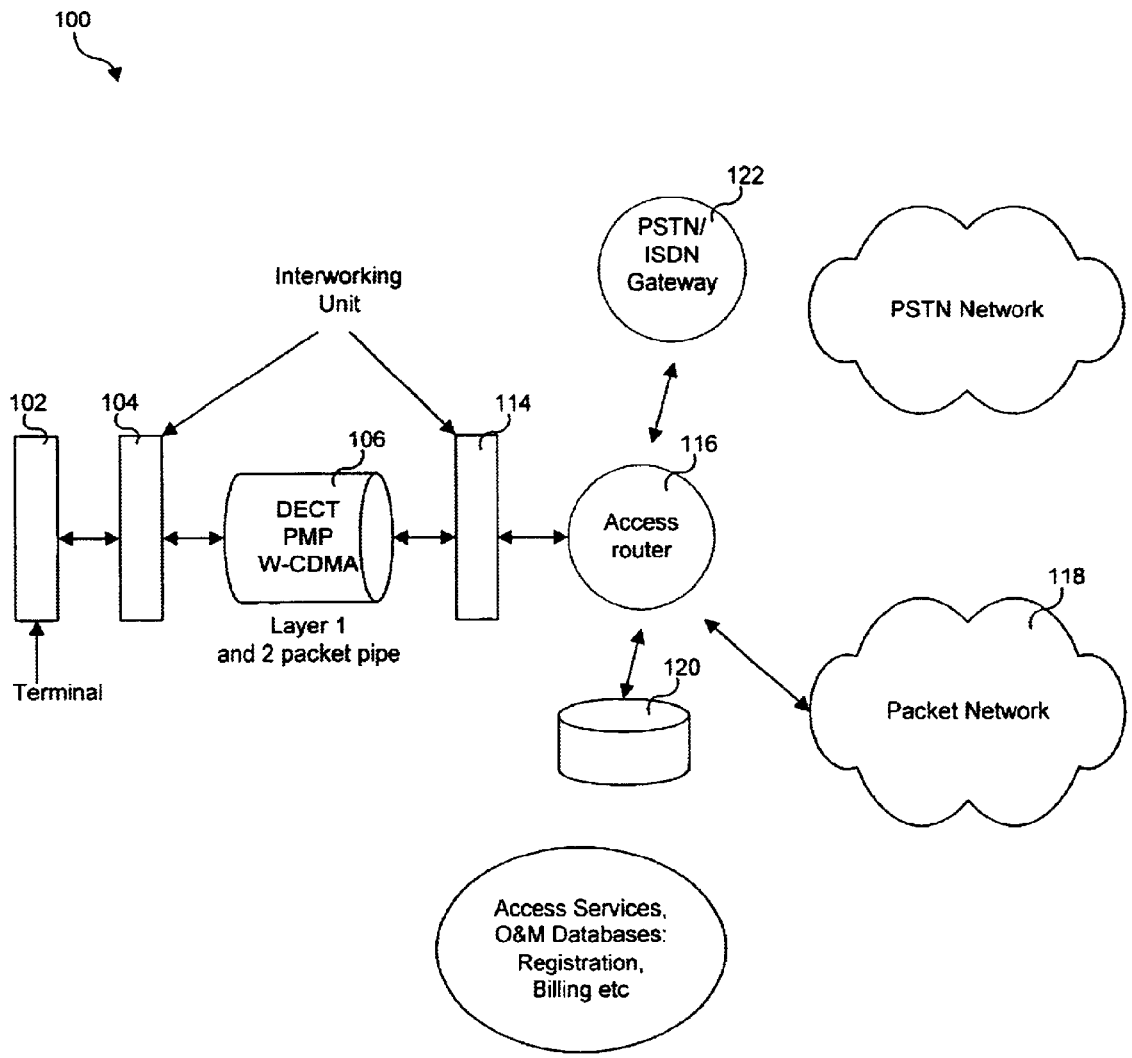
FIGS. 2A and 2B are related block diagrams of a packet pipe architecture for an access network, which can be implemented in accordance with a preferred embodiment of the present invention.
Figure 2B:
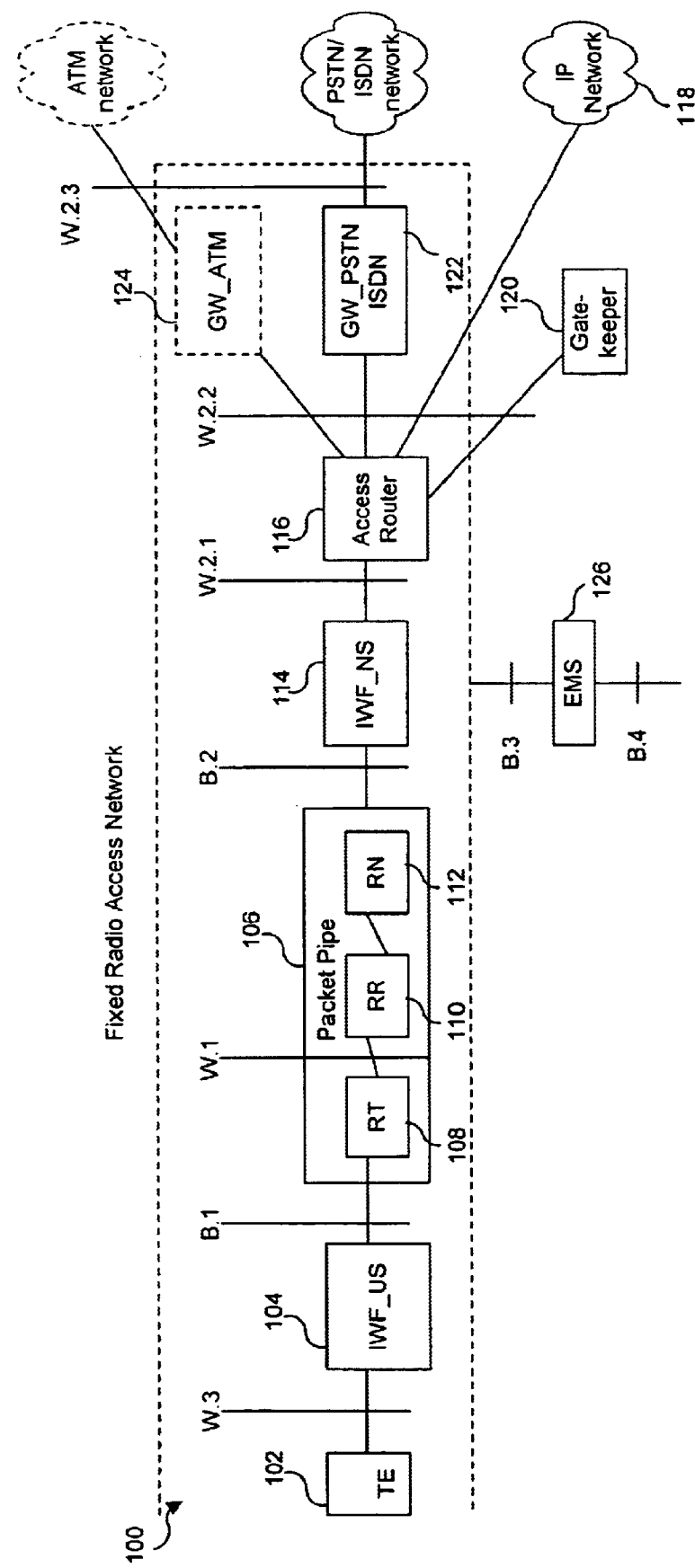
Figure 3:
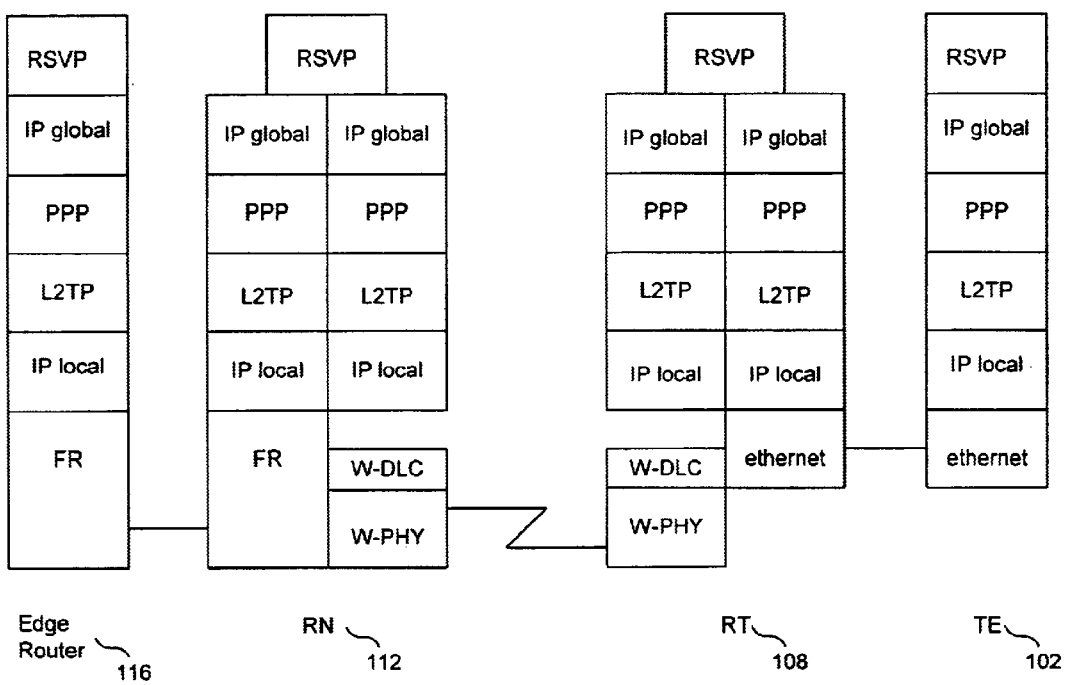
FIG. 3 is a protocol stack that can be used for the packet pipe shown in FIGS. 2A and 2B to provide QoS differentiation support in accessing an IP network and conveying packet data traffic therebetween, in accordance with the preferred embodiment of the present invention.

The preferred embodiment of the present invention and its advantages are best understood by referring to FIGS. 1–3 of the drawings, like numerals being used for like and corresponding parts of the various drawings.

Essentially, in accordance with a preferred embodiment of the present invention, a packet pipe architecture is provided for an access network (e.g., can provide access to an IP, ATM or similar packet-based network to convey packet data traffic therebetween), whereby the network interfaces with the packet pipe are standardized so that any packet pipe that satisfies the interface requirements can be utilized in the same access network. Also, the packet pipe uses a packet-based protocol stack with QoS provisions for service delivery instead of the conventional best effort service delivery functions used. Consequently, the packet pipe and access network are capable of providing all of the numerous services available with an IP, ATM or similar packet-based network layered architecture.

Specifically, FIGS. 2A and 2B are related block diagrams of a packet pipe architecture for an access network 100, which can be implemented in accordance with the preferred embodiment of the present invention. In the context of the present invention, a "packet pipe" can be a network or network component that is used primarily to convey packets of data. The exemplary network 100 includes a Terminal Equipment (TE) unit 102. For this embodiment, it can be assumed that one or more terminals located at end user premises can use an IP as a service bearer mechanism operating over an appropriate physical interface. However, the present invention is not limited to the use of such a protocol and can use other modes to transfer data, such as, for example, an ATM or other packet-based implementation (e.g., for a Base Transceiver Station (BTS) to Base Station Controller (BSC) interconnection).

The access network 100 also includes an Interworking Functions unit at the User Side (IWF_US) 104, which functions to map any application flows existing between a W.3 interface and a B.1 interface (to be described in detail below). For example, a B.1 to W.3 interface mapping functions to identify the type of flow, such as voice, data, streaming media, etc. Consequently, the QoS requirements for such a flow type are known and thus can be identified for use herein. This mapping also functions to identify and categorize the flow for pertinent bearer services, so that the packet pipe can schedule the flow for conveyance based on the relevant QoS requirements for that type of flow. As such, one IWF_US unit 104 can function to serve multiple users, multiple terminals, and/or multiple sessions. In this regard, the following InterWorking functions are provided between the radio access network 100 and the user (between the interface reference points W.3 and B.1): an IWF between the packet pipe and a Large Area Network (LAN) or Ethernet; an IWF between the packet pipe and one or more Plain Old Telephone System (POTS) or Integrated Services Digital Network (ISDN) telephones; and an IWF between the packet pipe and an E1 or T1 (leased) line. As such, the above-described list of IWFs is not intended to be all-inclusive.

For this embodiment, the interfaces supported by the IWF_US 104 to the user at the W.3 interface reference point are preferably open (not proprietary) interfaces based on industry-accepted standards. A generalized or generic interface can be provided at the B.1 interface reference point. For example, a W.3 interface can be generic to the extent that it is capable of handling whichever packet-based or circuit-based interface a TE provides as an input to an IWF_US and can classify QoS requirements for particular types of flows. Consequently, the IWF_US unit 104 can be used in conjunction with a plurality of different packet pipes, and conversely, one packet pipe can be used to service different IWFs.

At the B.1 interface, a predetermined set of primitives can be used with the W-Data Link Control (W-DLC) protocol layer, in order for the IWFs to be capable of requesting various services from the packet pipe and/or reserve resources. These primitives can be, for example: QoS information; fairness information; minimum traffic throughput information; resource allocation information, etc. A more detailed description of these exemplary primitives is provided below.

As such, for each of the various services to be supported by the packet pipe, a particular protocol stack can be defined. For example, for Ethernet or LAN types of services, layer 2 tunneling protocols (L2TP) may be used, or it may be more appropriate to terminate the protocols being used. In this context, the word "terminate" can means that a particular protocol segment is not passed further along the chain. For example, an IP destination can be terminated in a router (and possibly replaced by an other IP destination). Furthermore, depending on the choice of physical interfaces and protocol stacks used at the W.3 and W.2.1 interfaces, the access system can be designed symmetrically so that the IWFs used at both ends of the network can be identical.

In accordance with the present invention, the packet pipe (106) provides layer 1 and layer 2 functions to convey packet data traffic across a radio air interface. For this exemplary embodiment, the packet pipe 106 includes a Radio Termination (RT) unit 108 on the user side of the packet pipe, a Radio Relay (RR) unit 110 coupled to the RT unit, and a Radio Nodes (RN) unit 110 coupled to the RR unit on the network side. Preferably, the packet pipe 106 has a point-to-multipoint capability, and consequently, can support a plurality of different sessions from a plurality of different user terminals.

The packet pipe 106 also includes a plurality of B.x (e.g., B.1 and B.2) interfaces that operate as independently as possible from the radio technology being used. Furthermore, the packet pipe 106 is designed to provide a plurality of radio bearer services to the higher protocol layers (layers 3 and above), which services are characterized by different QoS parameters that define a set of QoS levels. These QoS levels can be associated with the applications involved, such as, for example, Voice over IP (VOIP), best effort data, data synchronized with voice, etc. As such, the RT unit 108 and RN unit 112 function to terminate the protocols from the access router 116 and terminals 102, respectively. The RR unit 110 can be a wireless transmitter and/or receiver, or a repeater.

The network 100 also includes an Interworking Functions unit at the Network Side (IWF_NS) 114, which is coupled to the RN unit 112 of the packet pipe. The IWF_NS unit 114 functions to map the application flows existing between the B.2 interface and W.2.1 interface (described in detail below). For this embodiment, one IWF_NS unit 114 can serve a plurality of communication sessions through a single packet pipe (106). Preferably, the IWF_NS unit maps all ongoing applications, such as, for example, voice, data, etc., from a plurality of terminals. For example, the Medium Access Control (MAC) part of layer 2 (data link layer) can participate in scheduling packets from terminals operating in a shared resource (e.g., within the coverage of the packet pipe). The packets can be mapped onto relevant bearers that carry the packets in accordance with predetermined criteria, such as, for example, a QoS requirement for latency, etc.

For this embodiment, an access router 116 provides connectivity to a plurality of Wide Area Networks (WANs), such as, for example, IP network 118. As such, the access router operates in a conventional manner to direct the data flowing to/from the WANs. Specifically, the primary purpose for using the access router as an "edge device" is to be able to provide (with a single access device) uniform access for a multiplicity of services, along with a relatively flexible bandwidth allocation capability, for each type of packet, cell and/or voice application handled. As such, the access router 116 functions as a service access node and can provide differentiated access functions in accordance with the particular service a user has requested. For example, a conventional access router can be used to provide an authentication capability which protects an authorized user's information base (in order to provide proper access service), and also avoids interference from a malicious user.

A gatekeeper unit 120 operates to handle call signalling and service functions (e.g., address resolution, bandwidth control, charging, etc.) for the end-points (e.g., terminal-to-terminal, gateway-to-terminal, or gateway-to-gateway) in, for example, an H.323-based (audio, video, data) network. As such, gatekeeper functions can be provided within a gateway device or by a separate gatekeeper node (e.g., handling up to several gateway devices at a time). By way of example, a gatekeeper unit can take part in the call handling processes, call signalling, conversion or mapping of IP addresses to associated phone numbers or user port ID numbers, bandwidth allocation, fee charging, etc.

A Public Switched Telephone Network/ISDN (PSTN/ISDN) gateway 122 operates to provide connectivity between certain IP-based services, such as, for example, VOIP, and PSTN/ISDN native services. The PSTN/ISDN gateway can have the following interfaces: a W.2.2 interface to the access router; and a W.2.3 interface to a PSTN/ISDN network using such known interfaces and protocols as, for example, ITU Standard G.703 or Synchronous Digital Hierarchy (SDH) and V5. The PSTN/ISDN gateway can provide such functions as protocol conversion, such as, for example, converting from an IP-based protocol stack to a pertinent telecommunications protocol stack (e.g., PSTN/ISDN protocol stack or OSI/MTP-based protocol stack).

An ATM gateway 124 provides service connectivity between IP-based services and ATM native services. The ATM gateway can also provide gatekeeper functions. The ATM gateway can be used if ATM native services (e.g., Voice Over ATM, Classical IP Over ATM, etc.) are supported by an ATM service network. An Element Management System (EMS) 126 provides monitoring and operational control functions for the elements comprising the fixed radio access network 100.

As mentioned above and shown in FIG. 2B, the access network 100 includes a plurality of interfaces at different reference points in the network. For example, the W.3 interface is located between the TE unit 102 and IWF_US unit 104. Preferably, the W.3 interface is an open interface (e.g., IP over an Ethernet or USB). A B.1 interface is located between the IWF_US unit 104 and the packet pipe 106. The B.1 interface is preferably a proprietary interface, but it also can be non-proprietary for other uses. For example, a B.1 interface can be standardized in accordance with an agreement between different access technology suppliers and/or operators.

A W.1 interface (e.g., air interface) is located between the RT unit 108 and RR unit 110 or RN unit 112 (not shown). In a different embodiment, the W.1 or radio air interface can also be located between the RR unit 110 and RN unit 112. The W.1 interface can be proprietary or non-proprietary.

A B.2 interface is located between the packet pipe 106 and the IWF_NS unit 114. The B.2 interface is preferably a proprietary interface, but it can also be non-proprietary for other uses. Similar to a B.1 interface, for example, a B.2 interface can be standardized in accordance with an agreement between different access technology suppliers and/or operators.

A W.2.1 interface is located between the IWF_NS unit 114 and the edge or access router 116. The W.2.1 interface is preferably non-proprietary. A W.2.2 interface is located between the edge or access router 116 and the IP Network 118, Gatekeeper 120, PSTN/ISDN Gateway 122, and ATM Gateway 124. The W.2.2 interface is preferably a non-proprietary interface, such as, for example, IP over Frame relay, ATM, or SONET/SDH. A W.2.3 interface is located between the PSTN/ISDN Gateway 122 and PSTN/ISDN Network 128, and the ATM Gateway 124 and ATM Network 130. The W.2.3 interface is preferably a non-proprietary interface such as, for example, V5.2 or ATM forum User Network Interface (UNI).

A B.3 interface is located between the EMS unit 126 and various components of the radio access network 100. The B.3 interface can be a proprietary or non-proprietary interface. A B.4 interface is provided between the EMS unit and the upper layer network management system. The B.4 interface can also be a proprietary or non-proprietary interface.

As mentioned above, the layer 1 and layer 2 packet pipe (106) provides a plurality of radio bearer services to the higher protocol layers, which services can be characterized by different Quality of Service (QoS) parameters. For this embodiment, the access network 100 manages QoS with the following approaches: Integrated Services (IntServ) or ReSerVation Protocol (RSVP) support; Differentiated Services (DiffServ) support; or by using a "drill down" protocol technology which can transfer QoS parameters down from the higher to the lower protocol stacks of the packet pipe 106. In accordance with the preferred embodiment of the present invention, a protocol stack for the packet pipe 106 which can provide QoS differentiation (DiffServ) support is shown in FIG. 3.

As illustrated by the protocol stack shown in FIG. 3, the IP global flows are terminated at the edges of the packet pipe 106 to provide packet classification. The RSVP services are terminated to access resource reservation parameters in order to manage sessions in the packet pipe. Also, a router-like technology is applied at the edges of the packet pipe. For example, the Edge router 116 differentiates packets in accordance with the different QoS requirements imposed. This differentiation between packets can be performed using, for example, RSVP (developed for supporting different QoS classes in IP applications, such as video-conferencing, multimedia, etc.), or a DiffServ classification function. Notably, various network transport mechanisms may be used with each DiffServ class.

As mentioned earlier, a primary function of the packet pipe 106 is to provide layer 1 and layer 2 functionality for conveying packetized traffic across a radio air interface (e.g., W.1 interface in this example). The interface between the packet pipe 106 and the upper layers in the overall protocol architecture also determines the type of packets (e.g., Packet Data Units or PDUs) that are submitted for transfer. As such, the primary scenarios for the packet pipe 106 can be described as follows: an IP-optimized packet pipe; an ATM-optimized packet pipe; and a packet pipe that supports both the IP and ATM models. The packet pipe provides an interface to the IWFs to reserve, remove or maintain a radio resource in agreement with the negotiated QoS.

In accordance with the preferred embodiment of the present invention, the packet pipe 106 can be designed to meet certain general requirements. A first requirement is that the packet pipe supports provision of different QoS classes to the higher layers. In that regard, a set of QoS classes in the packet pipe are defined. The packet pipe is then responsible for delivering satisfactory services within those QoS classes. A second requirement is that proper mechanisms exist to efficiently utilize scarce radio resources when they are allocated for different information flows, and also to obtain efficient access to the backbone network. A third requirement is that for proper radio resource capacity, the packet pipe's design should account for link budget calculations, in order to ensure that a satisfactory Bit Error Rate (BER) is secured for the Physical layer channels.

A fourth requirement for the packet pipe 106 is that mechanisms be provided to ensure that fairness principles govern when allocating radio resources to different sessions or users belonging to the same QoS class. In this regard, the packet pipe can prioritize packet traffic belonging to the same or a different QoS class during periods of congestion, which can leave control over the utilization of these scarce radio resources up to an operator.

A fifth requirement for the packet pipe 106 is that it be capable of segmenting and reassembling data transmissions. The packet pipe is required to provide efficient medium access control that also includes retransmission of erroneous data. This requires a segmentation function that splits incoming packets (N-PDUs) into smaller units prior to transmission across the radio air interface, in order to optimize the radio transfer by combining the Forward Error Correction (FEC) or redundancy by coding, and the Backward Error Correction (BEC) or redundancy by retransmission. Also, by sending smaller data units over the radio air interface, the preemption granularity becomes smaller which allows a finer tuning of the radio access for different QoS classes. Finally, a packet reassembly capability is required on the receiver side.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An access network architecture for providing terminal equipment (TE) with access to a packet data network through an access router, said architecture comprising:

a packet pipe that provides layer 1 and layer 2 functions to convey packet data traffic between the TE and the packet data network across a radio air interface, said packet pipe including:

a radio termination unit on a user side of the packet pipe, said radio termination unit including a first interface that converts a first protocol utilized by the TE to a second protocol;

a radio relay unit coupled to the radio termination unit; and a radio nodes unit coupled to the radio relay unit on a network side of the packet pipe, said radio nodes unit including a second interface that converts the second protocol to a third protocol utilized by the access router;

a first interworking function (IWF) coupled to the radio termination unit on the user side of the packet pipe, said first IWF mapping application flows between the TE and the radio termination unit, said first IWF identifying the type of flow and corresponding quality of service (QoS) requirements, and categorizing the flow for pertinent bearer services; and a second IWF coupled to the radio nodes unit on the network side of the packet pipe, said second IWF mapping application flows between the radio nodes unit and the access router, said second IWF mapping packets onto relevant bearers in accordance with the identified QoS requirements.

2. The access network architecture of claim 1 wherein the packet pipe includes a point-to-multipoint functionality for supporting a plurality of data sessions from a plurality of TEs.

3. The access network architecture of claim 1 wherein the packet pipe includes a protocol stack that supports Differentiated Services (DiffServ).

4. The access network architecture of claim 1 wherein the packet pipe includes means for calculating link budgets to ensure a satisfactory Bit Error Rate (BER) for physical layer channels.

5. The access network architecture of claim 1 wherein the packet pipe is optimized for transporting Asynchronous Transfer Mode (ATM) packets.

6. The access network architecture of claim 1 wherein the packet pipe provides an interface to the first and second IWFs to reserve, maintain, or remove a radio resource as determined by the identified QoS requirements.

7. The access network architecture of claim 1 wherein the packet pipe includes:

a set of defined QoS classes; and means for delivering satisfactory services as defined by the QoS classes.

8. The access network architecture of claim 7 wherein the packet pipe includes means for prioritizing packet data traffic belonging to the same or a different QoS class during times of congestion.

9. The access network architecture of claim 1 wherein the packet pipe is optimized for transporting Internet Protocol (IP) packets.

10. The access network architecture of claim 1 wherein the packet pipe includes a packet segmentation function that splits incoming packets into smaller units prior to transmission across the radio air interface.

11. The access network architecture of claim 10 wherein the packet pipe includes a packet reassembly function that joins packet units received across the radio air interface into reassembled packets.

* * * * *